US008534906B2

(12) United States Patent  (10) Patent No.: US 8,534,906 B2
Harada  (45) Date of Patent:  Sep. 17, 2013

(54) VACUUM KNEADING AND DEAERATING DEVICE

(75) Inventor: Manabu Harada, Tokyo (JP)

(73) Assignee: Kabushiki Kaisha Marukomu, Tokyo (JP)

( * ) Notice: Subject to any disclaimer, the term of this patent is extended or adjusted under 35 U.S.C. 154(b) by 46 days.

(21) Appl. No.: 13/381,763

(22) PCT Filed: Jun. 1, 2011

(86) PCT No.: PCT/JP2011/062568
§ 371 (c)(1),
(2), (4) Date: Dec. 30, 2011

(87) PCT Pub. No.: WO2011/155370
PCT Pub. Date: Dec. 15, 2011

(65) Prior Publication Data
US 2012/0106288 A1   May 3, 2012

(30) Foreign Application Priority Data

Jun. 8, 2010 (JP) ................................ 2010-131065
Dec. 28, 2010 (JP) ................................ 2010-292227

(51) Int. Cl.
*B01F 9/22* (2006.01)
*B01F 13/06* (2006.01)
(52) U.S. Cl.
USPC ......................................... 366/139; 366/217
(58) Field of Classification Search
USPC ........... 366/139, 209–219, 143, 602; 433/90, 433/91, 49; 494/19; 474/112–113
See application file for complete search history.

(56) References Cited

U.S. PATENT DOCUMENTS

| 3,199,775 | A | * | 8/1965 | Drucker | 494/19 |
| 6,733,170 | B2 | * | 5/2004 | Mukasa et al. | 366/139 |
| 7,201,512 | B2 | * | 4/2007 | Suzuki et al. | 366/217 |
| 7,438,460 | B2 | * | 10/2008 | Schmidt et al. | 366/139 |

(Continued)

FOREIGN PATENT DOCUMENTS

JP    10024231 A  *  1/1998
JP    11-290668 A     10/1999

(Continued)

OTHER PUBLICATIONS

IPER from PCT/JP2011/062568 dated Jan. 15, 2013.*

(Continued)

*Primary Examiner* — Charles E Cooley
(74) *Attorney, Agent, or Firm* — Holtz, Holtz, Goodman & Chick, PC

(57) ABSTRACT

A vacuum kneading and deaerating device has a rotatable body provided in a chamber held under a closed or pressure-reduced condition, and which is rotated in a horizontal plane around a basic driving rotation axis. A container holder is provided in the chamber rotationably on an operating rotation axis parallel to the basic driving rotation axis in a revolution edge portion of the rotatable body, and detachably holds a paste container such that a central axis of the paste container obliquely intersects the operating rotation axis. A driving mechanism rotates the rotating body and the container holder. A deaeration valve for opening an internal space of the paste container to an internal space of the chamber by the action of centrifugal force attending on the rotation of the paste container, or a paste material-impermeable and gas-permeable membrane, is provided in an opening portion of the paste container.

5 Claims, 3 Drawing Sheets

(56) References Cited

U.S. PATENT DOCUMENTS

| | | | |
|---|---|---|---|
| 8,092,075 B2 * | 1/2012 | Ishii | 366/139 |
| 2007/0025180 A1 * | 2/2007 | Ishii | 366/139 |
| 2009/0229465 A1 | 9/2009 | Takahashi | |
| 2012/0106288 A1 * | 5/2012 | Harada | 366/75 |

FOREIGN PATENT DOCUMENTS

| | | | | |
|---|---|---|---|---|
| JP | 2001246236 A | * | 9/2001 | |
| JP | 2003-201000 A | | 7/2003 | |
| JP | 2009208026 A | * | 9/2009 | |
| JP | 2009-220875 A | | 10/2009 | |
| JP | 2009/262017 A | | 11/2009 | |
| JP | 2011045873 A | * | 3/2011 | |
| JP | 2011235201 A | * | 11/2011 | |
| JP | 2012016694 A | * | 1/2012 | |
| WO | WO 2007/046511 A1 | | 4/2007 | |

OTHER PUBLICATIONS

International Search Report dated Sep. 13, 2011 issued in International Appln. No. PCT/JP2011/062568.

* cited by examiner (A)

(B)

(A)

(B)

(A)

(B)

(A)

(B)

VACUUM KNEADING AND DEAERATING DEVICE

This application is a U.S. National Phase Application under 35 USC 371 of Interrnational Application PCT/JP2011/062568 filed Jun. 1, 2011.

TECHNICAL FIELD

The present invention relates to a vacuum kneading and deaerating device.

BACKGROUND ART

For example, paste materials used as sealing compounds for liquid crystals, semiconductor elements, etc., conductive paste materials, resistor paste materials, or medical paste materials such as preparation pastes for ointments are required to be used in a state sufficiently kneaded and deaerated. Such a paste material is also often required to mix and disperse, for example, two or more liquids which are high in viscosity and different in specific gravity value, or a liquid and powder which are different in specific gravity.

Devices of various types are proposed as a kneading and deaerating device for kneading and deaerating a paste material at present. For example, there is proposed a device of the construction that a container holder detachably holding, for example, a cup-like paste container, in which a paste material to be kneaded has been contained, is rotated on an operating rotation axis parallel to a basic driving rotation axis extending in a vertical direction while being revolved around the basic driving rotation axis, thereby kneading the paste material and releasing (decorating) bubbles mixed in the paste material making good use of centrifugal force (see, for example, Patent Literature 1).

There is also proposed a kneading and deaerating device of the construction that the interior of a paste container is held under a pressure-reduced condition for efficiently releasing bubbles mixed in a paste material to conduct such a kneading and deaerating treatment as described above (see, for example, Patent Literature 2).

However, since these paste materials are generally used in a state filled into, for example, a syringe, a possibility that when the paste material subjected to the kneading and deaerating treatment is transferred from the paste container to the syringe, a gas may be entrained therein comes to be increased, so that there is a problem that the kneading and deaerating treatment already performed may possibly come to nothing.

In order to solve such a problem, there is proposed a kneading and deaerating device of the construction that after a paste material is contained in a closed syringe-like container, a kneading and deaerating treatment is conducted (see, for example, Patent Literature 3).

CITATION LIST

Patent Literature

Patent Literature 1: Japanese Patent Application Laid-Open No. 06-343913
Patent Literature 2: Japanese Patent No. 3627220
Patent Literature 3: Japanese Patent Application Laid-Open No. 2006-130492

SUMMARY OF INVENTION

Technical Problem

However, in the kneading and deaerating device of the construction that after the paste material is contained in the closed syringe-like container, the interior of the syringe-like container is held under a pressure-reduced condition to conduct the kneading and deaerating treatment, it is impossible to discharge the gas released in the syringe-like container by the deaerating action during the operation of the device to the outside of the syringe-like container, so that there is a problem that bubbles remain in the paste material even after the treatment, i.e., the deaeration is insufficient.

The present invention has been made on the basis of the foregoing circumstances and has as its object the provision of a vacuum kneading and deaerating device capable of uniformly and sufficiently kneading a paste material contained in a cylindrical paste container and sufficiently discharging (deaerating) bubbles mixed in the paste material with a high efficiency.

Solution to Problem

A vacuum kneading and deaerating device according to the present invention comprises a rotating body for revolution, which is provided rotationably in a horizontal plane around a basic driving rotation axis extending in a vertical direction in a chamber the internal space of which has been held under closed or pressure-reduced condition, a container holding means which is provided in the chamber rotationably on an operating rotation axis extending in a vertical direction in a revolution, edge portion of the rotating body for revolution and detachably holds a cylindrical paste container, in which a paste material to be kneaded and deaerated has been contained, in a state that a central axis of the paste container obliquely intersects the operating rotation axis, and a driving mechanism for rotating the rotating body for revolution and the container holding means, wherein a deaeration valve for opening an internal space of the paste container to the internal space of the chamber by the action of centrifugal force going outward in a radial direction of the rotating body for revolution attending on the revolution and rotation of the paste container is provided in an opening portion of the paste container for placing the paste material in the paste container.

In the vacuum kneading and deaerating device according to the present invention, the deaeration valve may be so constructed that it comprises a holder installed in a state that an end portion having the opening portion of the paste container has been received and having a through-hole formed at its center, and a valve disc having a stem portion inserted into the through-hole through a minute interstice formed with an inner peripheral surface of the through-hole of the holder, and the valve disc is slidably provided between a closing position brought into contact with an inner surface of the holder by the action of the centrifugal force going outward in the radial direction of the rotating body for revolution attending on the revolution and rotation of the paste container so as to block up the minute interstice, thereby closing the internal space of the paste container, and an opening position separated from the inner surface of the holder by the action of the centrifugal force going outward in the radial direction of the rotating body for revolution attending on the revolution and rotation of the paste container so as to cause the internal space of the paste container to communicate with the internal space of the pressure-reduced chamber through the minute interstice.

In the vacuum kneading and deaerating device according to the present invention, the valve disc may be so constructed that it further comprises a pressure-receiving plate in such a manner that the valve disc is moved to the closing position by the fact that the paste material contained in the paste container receives the centrifugal force going outward in the radial direction of the rotating body for revolution attending on the revolution and rotation of the paste container to press the pressure-receiving plate outward.

Another vacuum kneading and deaerating device according to the present invention comprises a rotating body for revolution, which is provided rotationally in a horizontal plane around a basic driving rotation axis extending in a vertical direction in a chamber the internal space of which has been held under a closed or pressure-reduced condition, a container holding means which is provided in the chamber rotationably on an operating rotation axis extending in a vertical direction in a revolution edge portion of the rotating body for revolution and detachably holds a cylindrical paste container, in which a paste material to be kneaded and deaerated has been contained, in a state that a central axis of the paste container obliquely intersects the operating rotation axis, and a driving mechanism for rotating the rotating body for revolution and the container holding means, wherein a paste material-impermeable and gas-permeable membrane, through which the paste material in the paste container is not permeated, but a gas released from the paste material is permeated, is provided in an opening portion of the paste container for placing the paste material in the paste container.

In the vacuum kneading and deaerating device according to the present invention, the gas-permeable membrane may preferably have a thickness of at least 60 μm and a pore size ranging from at least 0.02 μm to at most 20 μm.

Advantageous Effects of Invention

According to the vacuum kneading and deaerating device of the present invention, the paste container conducts orbital motion and precession at the same time under, for example, reduced pressure, thereby achieving sufficient kneading and deaerating actions on the paste material in the paste container fundamentally, so that the paste material in the paste container can be uniformly and sufficiently kneaded as a whole. In addition, the deaeration valve operated by the action of the centrifugal force, or the paste material-impermeable and gas-permeable membrane is provided in the opening portion of the paste container for placing the paste material, whereby the gas released in the internal space of the paste container by the deaerating action can be discharged out of the paste container to maintain the interior of the paste container at a proper degree of vacuum, so that the deaeration can be sufficiently conducted with a high efficiency, and the paste material after the treatment is provided as an even- and high-quality product.

Further, after the predetermined treatment is conducted, the paste container containing the paste material can be used in the present state as it is, so that the working efficiency can be improved, and it can be avoided to cause such an inconvenience that the quality of a final product using the paste material is lowered by mixing gas in the paste material again.

DESCRIPTION OF EMBODIMENTS

Embodiments of the present invention will hereinafter be described in detail.

<First Embodiment>

Figure 1:
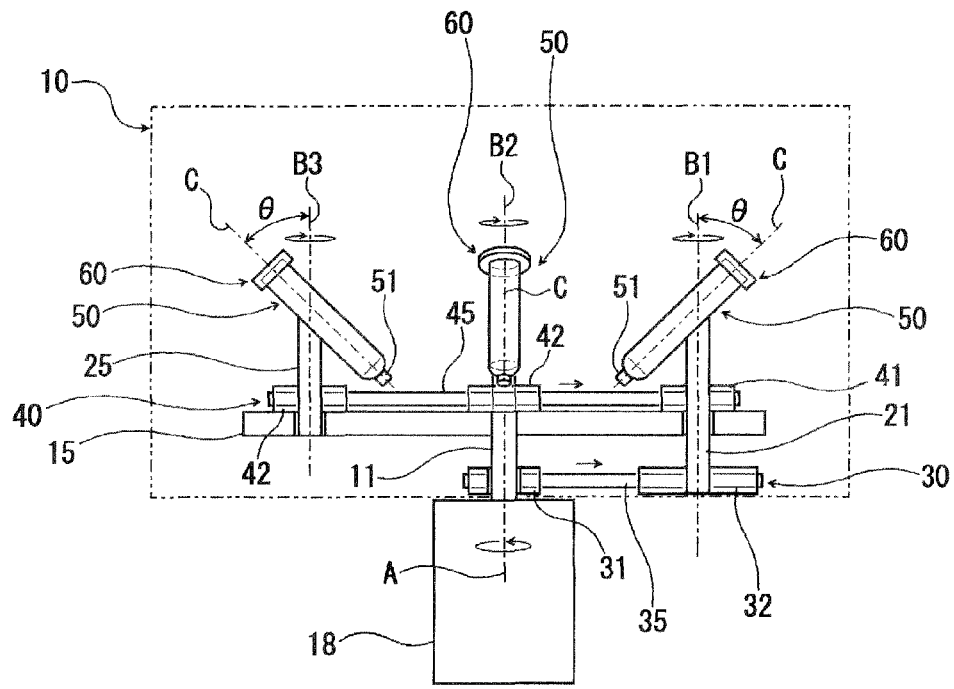
[FIG. 1] is an explanatory sectional view schematically illustrating the fundamental construction of an exemplary vacuum kneading and deaerating device according to a first embodiment of the present invention.
Figure 2:
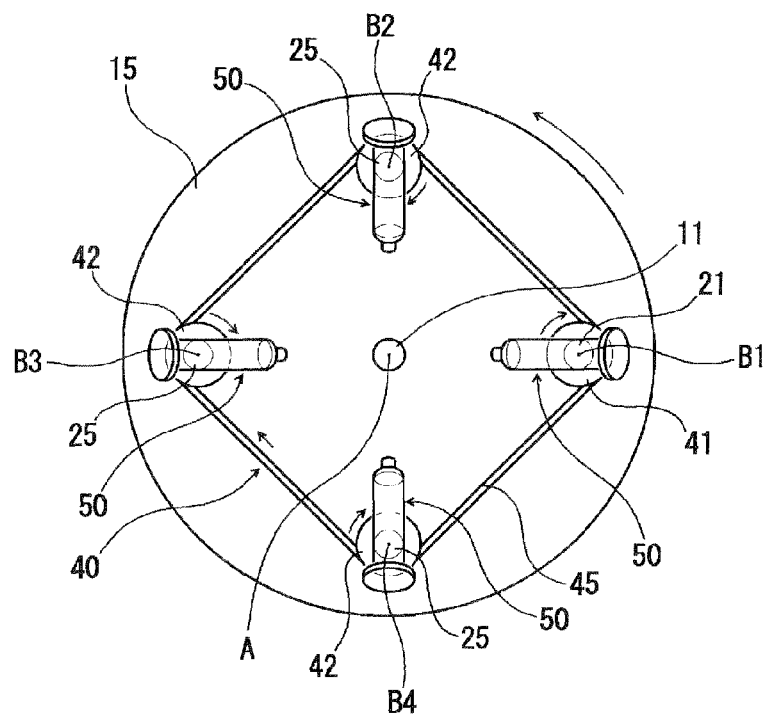
[FIG. 2] is a plan view of the vacuum kneading and deaerating device illustrated in FIG. 1 viewed from the above in a vertical direction.

FIG. 1 is an explanatory sectional view schematically illustrating the fundamental construction of an exemplary vacuum kneading and deaerating device according to the first embodiment of the present invention, and FIG. 2 is a plan view of the vacuum kneading and deaerating device illustrated in FIG. 1 viewed from the above in a vertical direction.

This vacuum kneading and deaerating device is equipped with a cylindrical chamber 10 forming a closed space in the interior thereof, a drive motor 18 having a driving rotation shaft 11 for revolution, which is rotationally driven on a central axis of rotation which is set as a basic driving rotation axis A, extending in a vertical direction, a disk-like rotating plate 15 for revolution, which is rotated in a horizontal plane on the basic driving rotation axis A, an operating rotation shaft 21 for rotation, which is provided rotationably on a central axis of rotation which is set as an operating rotation axis B1, extending in parallel with the basic driving rotation axis A, a plurality of driven rotation shafts 25 for rotation, which are respectively provided rotationably on central axes of rotation which are set as operating rotation axes B2 to B4 extending in parallel with the basic driving rotation axis A, a driving mechanism 30 of the operating rotation shaft for rotation for rotationally driving the operating rotation shaft 21 for rotation, a power transmission mechanism 40 for rotationaly driving the operating rotation shaft 21 for rotation and the respective driven rotation shafts 25 for rotation in a state synchronized with one another, and a pressure-reducing means (not illustrated) for rendering the interior of the chamber 10 a pressure-reduced condition, for example, a vacuum condition.

The drive motor 18 is arranged in such a mariner that the driving rotation shaft 11 for revolution extends airtightly through a bottom wail of the chamber 10 in a vertical direction (upward or downward direction in FIG. 1).

The rotating plate 15 for revolution is fixed to an upper end of the driving rotation shaft 11 for revolution so as to extend along a direction perpendicular to the basic driving rotation axis A.

The operating rotation shaft 21 for rotation is provided in a state extending through the rotating plate 15 for revolution in a thickness-wise direction thereof via, for example, bearings (not illustrated) in a revolution edge portion (right edge portion in FIG. 1) that conducts circular motion by the revolution of the rotating plate 15 for revolution.

The respective driven rotation shafts 25 for rotation are fixed at the proximal end portions thereof to the rotating plate 15 for revolution at positions separated at equal intervals in a circumferential direction from the operating rotation axis B1 on a circumference, on which the operating rotation axis B1 is located in the rotating plate 15 for revolution, via, for example, bearings (not illustrated).

The driving mechanism 30 of the operating rotation shaft for rotation is constructed by a fixed pulley 31 fixed to an upper surface of the bottom wall of the chamber 10 in a state that the driving rotation shaft 11 for revolution has been inserted (in a state independent of the driving rotation shaft 11 for revolution), a driving pulley 32 for rotation fixed at the same horizontal level position as the fixed pulley 31 in a proximal end portion of the operating rotation shaft 21 for rotation, and a decelerating timing belt 35 provided between the fixed pulley 31 and the driving pulley 32 for rotation by, for example, open belting. This driving mechanism 30 of the operating rotation shaft for rotation rotationally drives the operating rotation shaft 21 for rotation in such a manner that the direction of rotation thereof becomes a reverse direction (clockwise direction in FIG. 2) to the direction (anticlockwise direction in FIG. 2) of rotation of the rotating plate 15 for revolution.

The power transmission mechanism 40 is constructed by a driving pulley 41 fixed to the operating rotation shaft 21 for rotation at an upper level position on the rotating plate 15, driven pulleys 42 fixed to the respective driven rotation shafts 25 for rotation, and an endless timing belt 45 provided under tension between the driving pulley 41 and the driven pulleys 42.

The operating rotation shaft 21 for rotation and the respective driven rotation shafts 25 for rotation each have a container holding portion (not illustrated) detachably holding a cylindrical paste container containing a paste material on upper end portions thereof, thereby forming a container holder. Here, the paste container is a container (hereinafter referred to as "the syringe-like container") 50 having a form slender in an axial direction, in which a ratio of a length in the axial direction to a maximum inside diameter size of the container falls within a range of, for example, 2.5 to 20. The syringe-like container 50 in this embodiment has an opening portion for placing a paste material in the syringe-like container 50 at, for example, one end portion in the axial direction, and also has an electing portion 51 having a small diameter for ejecting the paste material subjected to a kneading and deaerating treatment at the other end portion.

The container holding portion holds the syringe-like container 50, for example, in a state that the ejecting portion 51 of the syringe-like container 50 is located on a lower side in a vertical direction, and a central axis C of the syringe-like container 50 obliquely intersects the operating rotation axis B1 (B2 to B4).

No particular limitation is imposed on an angle θ formed by the central axis C of the syringe-like container 50 and the operating rotation axis B1 (B2 to B4). However, the angle is preferably within a range of, for example, 15 to 60° and is 45° in the illustrated embodiment. The angle θ formed by the central axis C of the syringe-like container 50 and the operating rotation axis B1 (B2 to B4) may be set in a suitable range according to the kind of the paste material to be kneaded and deaerated, the rotating speed of the rotating plate 15 for revolution, the length in the axial direction and inside diameter of the syringe-like container 50, the rotating velocity of the operating rotation shaft 21 for rotation (driven rotation shaft 25 for rotation) and other conditions.

The rotating speed of the rotating plate 15 for revolution (revolving velocity of the syringe-like container 50) can be adjusted within a range of, for example, 400 to 2,000 rpm. The rotating speed (rotating velocity of the syringe-like container 50) of the operating rotation shaft 21 for rotation (driven rotation shaft 25 for rotation) rotationally driven by the rotation of the rotating plate 15 for revolution is set so as to become about ½ down to 1/10 as much as the rotating speed of the rotating plate 15 for revolution. Here, the rotating velocity of the syringe-like container 50 can be adjusted by adjusting a diameter ratio between the fixed pulley 31 and the driving pulley 32 for rotation which make up the driving mechanism 30 of the operating rotation shaft for rotation.

In addition, the rotating speed of the rotating plate 15 for revolution is preferably set within the above range in such a manner that the temperature rise of the paste material is, for example, 2° C./min or less.

A deaeration valve operated by the action of centrifugal force is provided in an opening portion on one side of the syringe-like container 50 used in the vacuum kneading and deaerating device of the above construction.

Figure 3:
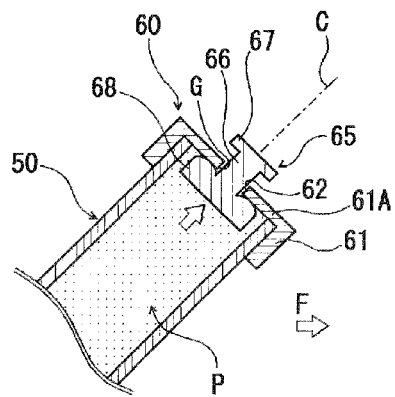
[FIGS. 3](A) and (B) are an explanatory views for explaining the operation of a deaeration valve provided in a paste container used in the vacuum kneading and deaerating device according to the first embodiment of the present invention.
Figure 3:
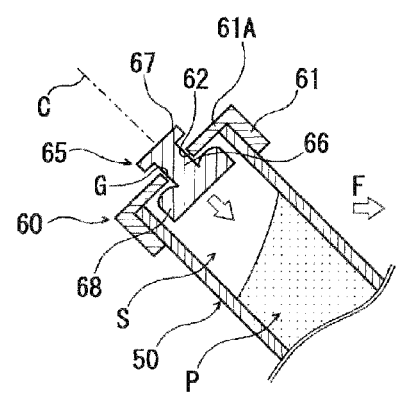

As illustrated in FIG. 3(A) and FIG. 3(B), the deaeration valve 60 is equipped with a holder 61 detachably installed on an end portion of the syringe-like container 50 so as to receive the end portion of the syringe-like container 50 to close the opening portion of the syringe-like container 50, and a valve disc 65 slidably provided in this holder 61. The holder 61 is formed by, for example, a rubber material.

The valve disc 65 is formed of, for example, aluminum or a plastic, and has a stem portion 66 arranged in a state inserted into a through-hole 62 formed in a central portion of an end wall 61A of the holder 61 in such a manner that a minute interstice G is formed with an inner peripheral surface of the through-hole 62, a disk-like lock portion 67 continuing with an upper or outer end of this stem portion 66 and having an outside diameter larger than the inside diameter of the through-hole 62 of the holder 61, and a body portion 68 continuing with a lower or inner end of the stem portion 66 and having an outside diameter larger than the inside diameter of the through-hole 62 of the holder 61.

Figure 4:
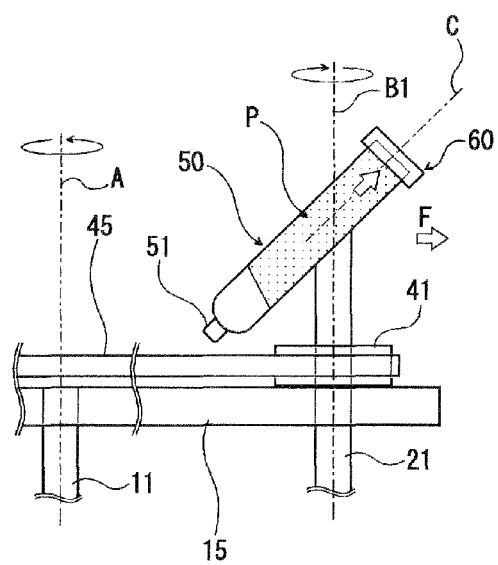
[FIGS. 4](A) and (B) are an explanatory views for explaining kneading and deaerating actions caused on a paste material contained in the paste container in the vacuum kneading and deaerating device according to the first embodiment of the present invention.
Figure 4:
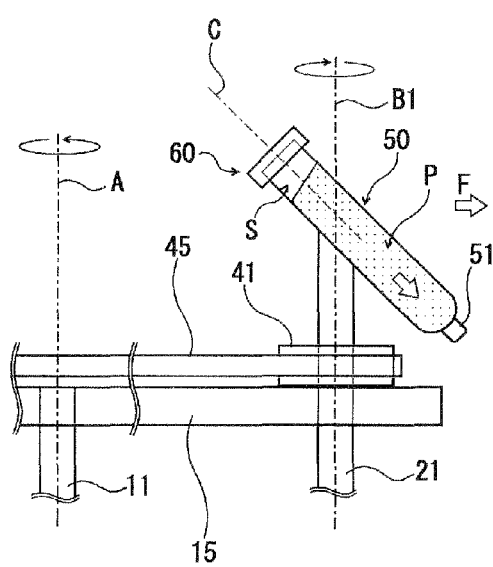

The valve disc 65 is slidably provided between a closing position where the valve disc is moved by the action of centrifugal force F going outward in a radial direction of the rotating plate 15 for revolution, said centrifugal force F being applied by the rotation of the operating rotation shaft 21 for rotation (driven rotation shaft 25 for rotation) when the syringe-like container 50 lies in a state fallen outward in such a manner that an upper side of the central axis C thereof is more separated than a lower side thereof from the basic driving rotation axis A as goes upward (see FIG. 4(A)), in such a manner that an upper surface of the body portion 68 is brought into contact with an inner surface of the end wall 61A of the holder 61 to block up the minute interstice G formed between the inner peripheral surface of the through-hole 62 of the holder 61 and an outer peripheral surface of the stem portion 66 of the valve disc 65, so as to close the internal space S of the syringe-like container 50 as illustrated in FIG. 3(A); and an opening position where the upper surface of the body portion 68 is separated from the inner surface of the end wall 61A of the holder 61 by the action of the centrifugal force F going outward in the radial direction of the rotating plate 15 for revolution, said centrifugal force F being applied by the rotation of the operating rotation shaft 21 for rotation (driven rotation shaft 25 for rotation) when the syringe-like container 50 lies in a state fallen inward in such a manner that the upper side of the central axis C thereof is more approached than the lower side thereof to the basic driving rotation axis A as goes upward (see FIG. 4(B)), so as to open the internal space S of the syringe-like container 50 to the internal space of the pressure-reduced chamber 10 through the minute interstice G as illustrated in FIG. 3(B).

The operation of the vacuum kneading and deaerating device will hereinafter he described.

The syringe-like container 50 containing a paste material P to be kneaded and deaerated is held by the container holding portion in toe operating rotation shaft 21 for rotation (driven rotation shaft 25 for rotation), and the internal space of the chamber 10 is held under a pressure-reduced condition. When the drive motor 18 is driven, the driving rotation shaft 11 for revolution is rotated to rotationally drive the rotating plate 15 for revolution fixed thereto around the basic driving rotation axis A in a horizontal plane.

With the rotational drive of the rotating plate 15 for revolution, the operating rotation shaft 21 for rotation and the decelerating timing belt 35 are also revolved together with the rotating plate 15 for revolution around the basic driving rotation axis A. However, the fixed pulley 31 is fixed independently of the driving rotation shaft 11 for revolution, so that the driving pulley 32 for rotation fixed to the operating rotation shaft 21 for rotation is rotated on the operating rotation axis B1 in a reverse direction to the direction of rotation of the rotating plate 15 for revolution. As a result, the operating rotation shaft 21 for rotation is driven rotationally on the operating rotation axis B1, and the respective driven rotation shafts 25 for rotation are driven rotationally on the respective operating rotation axes B2 to B4 in a state synchronized with one another by the timing belt 45.

The syringe-like containers 50 are held on the operating rotation shaft 21 for rotation and the driven rotation shafts 25 for rotation, which are rotated on the respective operating rotation shafts B1 to B4, in a state that a central axis C of each of the syringe-like containers 50 obliquely intersects the operating rotation axis B1 (B2 to B4), so that each of the syringe-like containers 50 conducts precession on a intersected position between the central axis C of the syringe-like container 50 and the operating rotation axis B1 (B2 to B4) by the rotation of the operating rotation shaft 21 for rotation (driven rotation shafts 25 for rotation) while revolving around the basic driving rotation axis A. In short, the syringe-like containers 50 conduct oscillating and rotating motion with a fixed angle to the operating rotation axis B1 (B2 to B4) while revolving around the basic driving rotation axis A.

Each of the syringe-like containers 50 conducts such orbital motion and precession at the same time, so that the paste material P contained in the syringe-like container 50 receives the action of centrifugal force by the orbital motion and also receives an action by the precession at the same time to conduct not only double rotating motion in a horizontal direction, but also motion including components in upward and downward directions. More specifically, when the syringe-like container 50 lies in a state fallen outward in such a manner that an upper side of the central axis C is more separated than a lower side thereof from the basic driving rotation axis A as goes upward by the precession, the paste material P in the syringe-like container 50 is moved to the upper side by the centrifugal force F going outward in the radial direction of the rotating plate 15 for revolution in such a manner that the paste material P is brought to a state biased on one end side (on the side of the deaeration valve 60) of the syringe-like container 50 as illustrated in FIG. 4(A). On the other hand, when the syringe-like container 50 lies in a state fallen inward in such a manner that the upper side of the central axis C is more approached than the lower side thereof to the basic driving rotation axis A as goes upward by the precession, the paste material P in the syringe-like container 50 is moved to the lower side by the centrifugal force F going outward in the radial direction of the rotating plate 15 for revolution in such a manner that the paste material P is brought to a state biased on the other end side (on the side of the ejecting portion 51) of the syringe-like container 50 as illustrated in FIG. 4(B), whereby the paste material P receives a spiral kneading action.

The paste material P in the syringe-like container 50 receives the spiral kneading action, whereby bubbles mixed in the paste material P receives a deaerating action so as to be brought into intense contact with a vacuum interface in the syringe-like container 50, so that the bubbles come to be released (deaerated) in the internal space S of the syringe like container 50. However, in the vacuum kneading and deaerating device described above, the deaeration valve 60 provided in the syringe-like container 50 is opened and closed by the action of the centrifugal force F going outward in the radial direction of the rotating plate 15 for revolution by the revolution and rotation of the syringe-like container 50, whereby the decoration of the paste material P is conducted in a state that the interior of the syringe-like container 50 has been maintained at a predetermined pressure-reduced condition.

More specifically, when the syringe-like, container 50 lies in a state fallen outward in such a manner that the upper side of the central axis C thereof is more separated than the lower side thereof from the basic driving rotation axis A as goes upward by the precession as illustrated in FIG. 3(A), the valve disc 65 is moved to the closing position by the action of the centrifugal force F going outward in the radial direction of the rotating plate 15 for revolution by the orbital motion and precession of the syringe-like container 50 in such a manner that an upper surface of the body portion 68 thereof is brought into contact with an inner surface of the end wall 61A of the holder 61 to block up the minute interstice C, thereby closing the internal space of the syringe-like container 50 to prevent the paste material P from flowing out to the outside. On the other hand, when the syringe-like container 50 lies in a state fallen inward in such a manner that the upper side of the central axis C thereof is more approached than the lower side thereof to the basic driving rotation axis A as goes upward by the precession as illustrated in FIG. 3(B), the valve disc 65 is moved to the opening position by the action of the centrifugal force F going outward in the radial direction of the rotating plate 15 for revolution by the orbital motion and precession of the syringe-like container 50 in such a manner that the upper surface of the body portion 68 thereof is separated from the inner surface of the end wall 61A of the holder 61. When the valve disc 65 is located at the opening position that the internal space S of the syringe-like container 50 is opened, the internal space S of the syringe-like container 50 is caused to communicate with the internal space of the pressure-reduced chamber 10 through the minute interstice G formed between the outer peripheral surface of the stem portion 66 of the valve disc 65 and the inner peripheral surface of the through-hole 62 of the holder 61, whereby the gas released from the paste material P into the internal space of the syringe-like container 50 by the deaerating action on the paste material P is discharged to the outside of the syringe-like container 50, and the interior of the syringe-like container 50 is maintained at the predetermined pressure-reduced condition.

According to the vacuum kneading and deaerating device described above, the syringe-like container 50 conducts orbital motion and precession under reduced pressure, thereby achieving sufficient kneading and deaerating actions on the paste material P in the syringe-like container 50 fundamentally, so that the paste material P in the syringe-like container 50 can be uniformly and sufficiently kneaded as a whole. In addition, the deaeration valve 60 operated by the action of the centrifugal force is provided in the syringe-like container 50, whereby the gas released in the internal space S of the syringe-like container 50 by the deaerating action can be discharged to the outside of the syringe-like container 50 to maintain the interior of the syringe-like container 50 at a proper pressure-reduced condition, so that the deaeration of the paste material P can be sufficiently conducted with a high efficiency, and the paste material after the treatment is provided as an even- and high-quality product.

In addition, after the predetermined treatment is conducted, the syringe-like container 50 containing the paste material P can be used in the present state as it is, so that the working efficiency can be improved, and it can be avoided to cause such an inconvenience that the quality of a final product using the paste material P is lowered by mixing the gas in the paste material again.

<Second Embodiment>

In a vacuum kneading and deaerating device according to the second embodiment of the present invention, a container of the construction that a lid member 70 having a degassing function is provided in an opening portion on one end side for placing the paste material P in the syringe-like container 50 is used as the syringe-like container 50.

Figure 5:
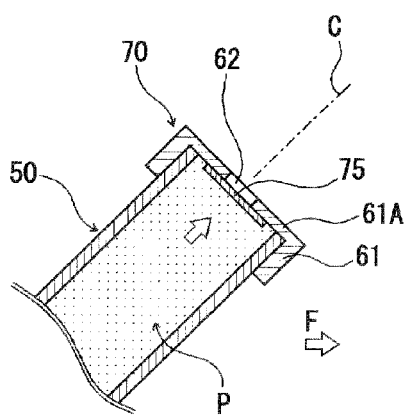
[FIGS. 5](A) and (B) are an explanatory views for explaining the action of a gas-permeable membrane provided in a paste container used in a vacuum kneading and deaerating device according to a second embodiment of the present invention.
Figure 5:
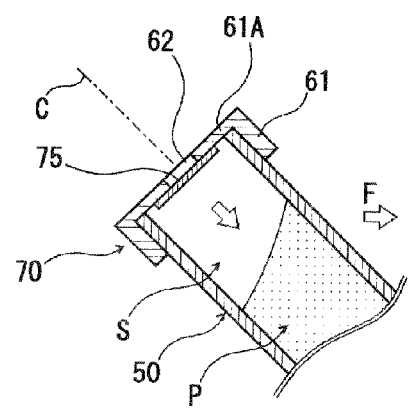

As illustrated in FIG. 5(A) and FIG. 5(B), the lid member 70 is constructed by a cylindrical closed-end holder 61 detachably installed on the opening portion on one end side of the syringe-like container 50 so as to receive the one end portion of the syringe-like container 50 to close the opening portion of the syringe-like container 50 and a paste material-impermeable and gas-permeable membrane 75 provided on an inner surface of an end wall 61A of this holder 61 so as to cover a through-hole 62 formed in a central portion of the end wall 61A.

The gas-permeable membrane 75 is of, for example, a filmy form and can be formed by, for example, a polymeric separation membrane having a nature that the paste material P in the interior of the syringe-like container 50 is not permeated, but a gas released from the paste material P is permeated.

A membrane having a thickness of 60 μm or more and a pore size within a range of, for example, from 0.02 μm or more to 20 μm or less is preferably used as the gas-permeable membrane 75.

The reason why the membrane whose pore size falls within the above range is preferably used as the gas-permeable membrane 75 will hereinafter be described.

For example, assuming that a maximum mass of the paste material contained in the syringe-like container 50 is m [kg], an orbital radius (a distance between the basic driving rotation axis A and the operating rotation axis B1 (B2 to B4)) of the syringe-like container 50 is r [m], an orbital frequency of the syringe-like container 50 is f [Hz], and a rotation angle (an angle formed between the central axis C and the operating rotation axis B1 (B2 to B4) of the syringe-like container 50) of the syringe-like container 50 is θ [°], a maximum value $F_{max}$ [N] of the centrifugal force acted on the paste material P is represented by the following expression (1).

[Math. 1]

$$F_{max} = m \times r \times (2\pi f)^2 \times \cos\theta \qquad \text{Expression (1)}$$

Accordingly, assuming that an inner radius of the syringe-like container 50 is b [m], and an average value of the centrifugal force is F, an average value P [Pa] of a pressure acted on the gas-permeable membrane 75 is represented by the following expression (2).

Expression (2)

$$P = \frac{F}{\pi \times b^2}, F = \frac{F_{max}}{2} \qquad \text{[Math. 2]}$$

On the other hand, assuming that a pore radius (an average radius or a radius of a suspended particle) of the gas-permeable membrane 75 is a [m], a membrane thickness of the gas-permeable membrane 75 is L [m], and a viscosity of the paste material P is η [Pa·s], a flow rate q [m³/s] of the paste material flowing through pores of the gas-permeable membrane 75 is represented by the following expression (3) according to the Hagen-Poiseuille's law.

Expression (3)

$$q = \frac{\pi \times a^4 \times P}{8 \times L \times \eta} \qquad \text{[Math. 3]}$$

In addition, assuming that a maximum value of a kneading time is $t_{max}$ [min], a maximum value of a rotational speed of the revolution is $N_{max}$ [rpm], and a pressurizing time per one revolution by the centrifugal force acted on the gas-permeable membrane 75 is tp [s], a critical flow rate $q_{min}$ [m³/s] that the paste material P does not flow out through the pores of the gas-permeable membrane 75 is represented by the following expression (4).

Expression (4)

$$q_{min} = \frac{\pi \times a^2 \times L}{t_{max} \times N_{max} \times tp} \qquad \text{[Math. 4]}$$

Accordingly, when q is smaller than $q_{min}$, the paste material P is not discharged through the pores of the gas-permeable membrane 75, so that the relationship of the following expression (5) is derived from the expression (3) and the expression (4).

Expression (5)

$$\frac{a}{L} < \alpha \times \eta^{\frac{1}{2}}, \alpha = \left[\frac{8}{P \times t_{max} \times N_{max} \times tp}\right]^{\frac{1}{2}} \qquad \text{[Math. 5]}$$

In the vacuum kneading and deaerating device described above, it is determined that the maximum mass m of the paste material P contained in the syringe-like container 50 is 5 to 50 [g] (60 to 80% of the capacity of the syringe-like container 50), the orbital radius r of the syringe-like container 50 is 80 to 120 [mm], the orbital frequency f of the syringe-like container 50 is 5 to 20 [Hz], the rotation angle θ of the syringe-like container 50 is 15 to 60 [°], the inner radius b of the syringe-like container 50 is 4 to 12 [mm], the orbital period T of the syringe-like container 50 is 50 to 200 [ms], the orbital time is within 10 minutes, and a ratio (rotational speed ratio) α of the orbital speed to the rotational speed of the syringe-like container 50 is ½ to 1/10. Accordingly, an α value that the paste material P does not flow out through the pores under conditions of maximum centrifugal force and a maximum orbital time is $0.37 \times 10^{-3}$ or less.

In addition, a lower limit value of the $\eta_{min}$ viscosity of the paste material P treated in the vacuum kneading and deaerating device is, for example, about 0.2 [Pa·s], so that a lower limit value $a_{min}$ of the pore radius in the gas-permeable membrane 75 when the thickness of the gas-permeable membrane 75 is 60 [μm] or more (the minimum value $L_{min}$ is 60 [μm]) is $a_{min}=L_{min}\times\alpha_{max}+\eta_{min}^{(1/2)}\approx 0.01$ [μm] according to above expression (5), and so the lower limit value of the pore size of the gas-permeable membrane 75 is 0.02 [μm].

On the other hand, when the paste material P to be treated is a material in which a liquid and a particulate matter are mixed, such as a sealing compound for LED production prepared by mixing a particulate fluorescent material in a pasty thermosetting resin material, an upper limit value of the pore size in the gas-permeable membrane 75 is only required not to discharge the particulate matter (fluorescent material) through the pores. For example, the particle size of the fluorescent material in the sealing compound for LED production is generally larger than, for example, 10 [μm], so that the upper limit value of the pore size in the gas-permeable membrane 75 may be set to 10 [μm].

In the vacuum kneading and deaerating device of such construction, bubbles mixed in the paste material P receive a deaerating action so as to be brought into intense contact with a vacuum interface in the syringe-like container 50 in a process from a state the syringe-like container 50 has fallen outward in such a manner that an upper side of the central axis C thereof is more separated than a lower side thereof from the basic driving rotation axis A as goes upward by the precession as illustrated in FIG. 5(A) to a state that the syringe-like container 50 has fallen inward in such a manner that the upper side of the central axis C thereof is more approached than the lower side thereof to the basic driving rotation axis A as goes upward by the precession as illustrated in FIG. 5(B), so that the bubbles are released (decorated) in the internal space S of the syringe-like container 50.

The paste material P in the syringe-like container 50 is then moved to the upper end side in the axial direction of the syringe-like container 50 while pressing the gas (air) released in the internal space S o the syringe-like container 50 by the action of the centrifugal force F going outward in the radial direction of the rotating plate 15 for revolution by the orbital motion and precession of the syringe-like container 50 in a process from the state illustrated in FIG. 5(B) to the state illustrated in FIG. 5(A), whereby the gas in the internal space S of the syringe-like container 50 is caused to permeate through the gas-permeable membrane 75 and discharged to the outside of the syringe-like container 50 through the through-hole 62, and the interior of the syringe-like container 50 is maintained at the predetermined pressure-reduced condition. Here, even in a state that the centrifugal force F acted on the paste material P becomes maximum (a stare illustrated in FIG. 5(A)), the paste material P is not discharged through the pores of the gas-permeable membrane 75 by virtue of the viscosity of the paste material P itself.

The same effects as in the first embodiment can be achieved in the vacuum kneading and deaerating device described above. More specifically, the paste material P in the syringe-like container 50 can be uniformly and sufficiently kneaded as a whole. In addition, by the construction that the lid member 70 equipped with the gas-permeable membrane 75 having the specific pore size is provided on the opening portion on one end side of the syringe-like container 50, the gas released in the internal space S of the syringe-like container 50 by the deaerating action can be discharged to the outside of the syringe-like container 50 through the gas-permeable membrane 75 to maintain the interior of the syringe-like container 50 at a proper pressure-reduced condition, so that the deaeration of the paste material P can be sufficiently conducted with a high efficiency, and the paste material after the treatment is provided as an even- and high-quality product.

The embodiments of the present invention have been described above. However, the present invention is not limited to the above-described embodiments, and various changes or modifications may be added thereto.

Figure 6:
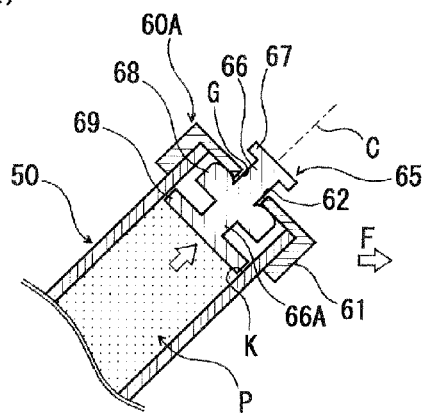
[FIGS. 6](A) and (B) are an explanatory views for explaining the operation of another deaeration valve provided in the paste container in the vacuum kneading and deaerating device according to the first embodiment of the present invention.
Figure 6:
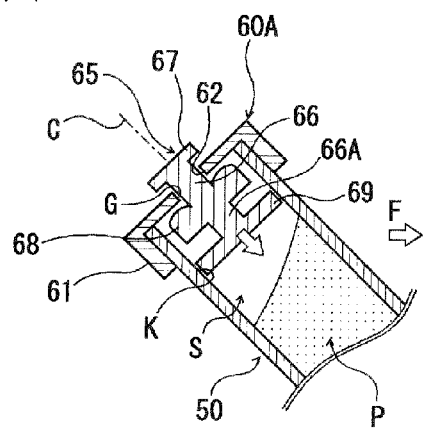

For example, in the vacuum kneading and deaerating device according to the first embodiment, the deaeration valve provided in the syringe-like container is not limited to the construction operated by the centrifugal force acted on the mass of the body portion itself. For example, a construction operated by a pressure of the paste material P, which is caused by the action of the centrifugal force received by the paste material P contained in the syringe-like container 50, as illustrated in FIG. 6(A) and FIG. 6(B), may also be adopted. Even in such construction, the same effects as in the above-described embodiments can be achieved.

This deaeration valve 60A has the same construction as the deaeration valve 60 in the above-described embodiment except that the valve disc 65 in the deaeration valve 60 further has a disk-like pressure-receiving plate 69 continuing with a lower end of the body portion 68 through a stem portion 66A and having an outside diameter smaller than the inside diameter of the syringe-like container 50. Here, a minute interstice K through which only the gas deaerated from the paste material P is passed is formed between a peripheral surface of the pressure-receiving plate 69 in the valve disc 65 and an inner peripheral surface of the syringe-like container 50.

This deaeration valve 60A is slidably provided between a closing position where the valve disc is moved by pressing the pressure-receiving plate 69 of the valve disc 65 outward by the paste material P by the action of centrifugal force F going outward in a radial direction of the rotating plate 15 for revolution, said centrifugal force F being applied to the paste material P in the syringe-like container 50 by the rotation of the operating rotation shaft 21 for rotation (driven rotation shaft 25 for rotation) when the syringe-like container 50 lies in a state fallen outward in such a manner that an upper side of central axis C thereof is more separated than a lower side thereof from the basic driving rotation axis A as goes upward, in such a manner that an upper surface of the body portion 68 is brought into contact with an inner surface of the end wall 61A of the holder 61 to block up the minute interstice G formed between an inner peripheral surface of the through-hole 62 and an outer peripheral surface of the stem portion 66 of the valve disc 65, so as to close the internal space S of the syringe-like container 50 as illustrated in FIG. 6(A); and an opening position where the upper surface of the body portion 68 is separated from the inner surface of the end wall 61A of the holder 61 by the action of the centrifugal force F going outward in the radial direction of the rotating plate 15 for revolution, said centrifugal force F being applied by the rotation of the operating rotation shaft 21 for rotation (driven rotation shaft 25 for rotation) when the syringe-like container 50 lies in a state fallen inward in such a manner that the upper side of the central axis C thereof is more approached than the lower side thereof to the basic driving rotation axis A goes upward, so as to open the internal space S of the syringe-like container 50 to the internal space of the pressure-reduced chamber 10 through the minute interstice G as illustrated in FIG. 6(B). When the valve disc 65 is located at the opening position, the internal space S of the syringe-like container 50 is caused to communicate with the internal space of the pressure-reduced chamber 10 through the minute interstice k formed between the peripheral surface of the pressure-receiving plate 69 and the inner peripheral surface of the syringe-like container and the minute interstice G formed between the outer peripheral surface of the stem portion 66 of the valve disc 65 and the inner peripheral surface of the through-hole 62 of the holder 61, whereby the gas released from the paste material P into the internal space S of the syringe-like container 50 by the deaerating action on the paste material P is discharged to the outside of the syringe-like container 50, and the interior of the syringe-like container 50 is maintained at the predetermined pressure-reduced condition.

In the vacuum kneading and deaerating devices according to the present invention, the number of the container holding portions each holding the syringe-like container is not particularly limited.

In addition, the driving mechanism of the operating rotation shaft for rotation is not, limited to the above-described construction so far as the orbital motion and precession of the syringe-like container are achieved. For example, the mechanism may also he constructed by a planetary gear mechanism. The fact that the power source of the orbital motion and precession is common is also not always required.

Industrial Applicability

As described above, the vacuum kneading and deaerating devices according to the present invention can uniformly and sufficiently knead a paste material contained in the syringe-like container and sufficiently discharge (deaerate) bubbles mixed in the paste material with a high efficiency, and thus are extremely useful when the paste material is required to be used by making the bubbles extremely small up to a size of, for: example, 1 μm or smaller. Specific examples of such requirements include a kneading and deaerating treatment of a sealing compound used upon the production of an LED constructed by molding chip-like blue LED elements by a fluorescent material layer formed of a transparent thermosetting resin (sealing compound) with a YAG fluorescent material (yellow fluorescent material) mixed therein, said LED emitting white light by blue light transmitted through the fluorescent material layer from the blue LED elements and yellow light emitted from the fluorescent material layer by exciting the fluorescent material by the blue light from the blue LED elements.

| REFERENCE SIGNS LIST | |
|---|---|
| 10 | Chamber |
| 11 | Driving rotation shaft for revolution |
| 15 | Rotating plate for revolution |
| 18 | Drive motor |
| 21 | Operating rotation shaft for rotation |
| 25 | Driven rotation shaft for rotation |
| 30 | Driving mechanism of the operating rotation shaft for rotation |
| 31 | Fixed pulley |
| 32 | Driving pulley for rotation |
| 35 | Decelerating timing belt |
| 40 | Power transmission mechanism |
| 41 | Driving pulley |
| 42 | Driven pulley |
| 45 | Timing belt |
| 50 | Syringe-like container |
| 51 | Ejecting portion |
| 60, 60A | Deaeration valves |
| 61 | Holder |
| 61A | End wall |
| 62 | Through-hole |
| 65 | Valve disc |
| 66, 66A | Stem portions |
| 67 | Lock portion |
| 68 | Body portion |

-continued

| REFERENCE SIGNS LIST | |
|---|---|
| 69 | Pressure-receiving plate |
| 70 | Lid member |
| 75 | Gas-permeable membrane |
| A | Basic driving rotation axis |
| B1-B4 | Operating rotation axes |
| C | Central axis of a syringe-like container |
| G | Minute interstice |
| K | Minute interstice |
| P | Paste material |
| S | Internal space of a syringe-like container |

The invention claimed is:

1. A vacuum kneading and deaerating device comprising a rotating body for revolution, which is provided rotationably in a horizontal plane around a basic driving rotation axis extending in a vertical direction in a chamber the internal space of which has been held under a closed or pressure-reduced condition, a container holding means which is provided in the chamber rotationably on an operating rotation axis extending in a vertical direction in a revolution edge portion of the rotating body for revolution and detachably holds a cylindrical paste container, in which a paste material to be kneaded and deaerated has been contained, in a state that a central axis of the paste container obliquely intersects the operating rotation axis, and a driving mechanism for rotating the rotating body for revolution and the container holding means, wherein a deaeration valve for opening an internal space of the paste container to the internal space of the chamber by the action of centrifugal force going outward in a radial direction of the rotating body for revolution attending on the revolution and rotation of the paste container is provided in an opening portion of the paste container for placing the paste material in the paste container.

2. The vacuum kneading and deaerating device according to claim 1, wherein the deaeration valve comprises a holder installed in a state that an end portion having the opening portion of the paste container has been received and having a through-hole formed at its center, and a valve disc having a stem portion inserted into the through-hole through a minute interstice formed with an inner peripheral surface of the through-hole of the holder, and the valve disc is slidably provided between a closing position brought into contact with an inner surface of the holder by the action of the centrifugal force going outward in the radial direction of the rotating body for revolution attending on the revolution and rotation of the paste container so as to block up the minute interstice, thereby closing the internal space of the paste container, and an opening position separated from the inner surface of the holder by the action of the centrifugal force going outward in the radial direction of the rotating body for revolution attending on the revolution and rotation of the paste container so as to cause the internal space of the paste container to communicate with the internal space of the pressure-reduced chamber through the minute interstice.

3. The vacuum kneading and deaerating device according to claim 2, wherein the valve disc further comprises a pressure-receiving plate in such a manner that the valve disc is moved to the closing position by the fact that the paste material contained in the paste container receives the centrifugal force going outward in the radial direction of the rotating body for revolution attending on the revolution and rotation of the paste container to press the pressure-receiving plate outward.

4. A vacuum kneading and deaerating device comprising a rotating body for revolution, which is provided rotationably in a horizontal plane around a basic driving rotation axis extending in a vertical direction in a chamber the internal space of which has been held under a closed or pressure-reduced condition, a container holding means which is provided in the chamber rotationably on an operating rotation axis extending in a vertical direction in a revolution edge portion of the rotating body for revolution and detachably holds a cylindrical paste container, in which a paste material to be kneaded and deaerated has been contained, in a state that a central axis of the paste container obliquely intersects the operating rotation axis, and a driving mechanism for rotating the rotating body for revolution and the container holding means, wherein a paste material-impermeable and gas-permeable membrane, through which the paste material in the paste container is not permeated, but a gas released from the paste material, is permeated, is provided in an opening portion, of the paste container for placing the paste material in the paste container.

5. The vacuum kneading and deaerating device according to claim 4, wherein the gas-permeable membrane has a thickness of at least 60 μm and a pore size ranging from at least 0.02 μm to at most 20 μm.

\* \* \* \* \*